(12) United States Patent
Daniel

(10) Patent No.: US 7,048,330 B2
(45) Date of Patent: May 23, 2006

(54) VEHICLE SEAT ASSEMBLY FOR STORAGE IN A VEHICLE FLOOR TUB

(75) Inventor: Patrick Daniel, Bloomfield Hills, MI (US)

(73) Assignee: Faurecia Automotive Seating Canada Limited, Mississauga (CA)

(*) Notice: Subject to any disclaimer, the term of this patent is extended or adjusted under 35 U.S.C. 154(b) by 175 days.

(21) Appl. No.: 10/669,343

(22) Filed: Sep. 25, 2003

(65) Prior Publication Data

US 2004/0124682 A1    Jul. 1, 2004

Related U.S. Application Data

(60) Provisional application No. 60/414,182, filed on Sep. 27, 2002.

(51) Int. Cl.
  *B60N 2/32* (2006.01)
(52) U.S. Cl. .......................................... 297/15; 297/336
(58) Field of Classification Search ........... 297/378.12, 297/334–336, 14–15, 344.11, 344.1, 331; 296/65.01, 65.05, 65.09, 65.11, 65.16
  See application file for complete search history.

(56) References Cited

U.S. PATENT DOCUMENTS

| | | | | |
|---|---|---|---|---|
| 2,858,877 A | * | 11/1958 | Krause | 296/65.11 |
| 5,195,795 A | * | 3/1993 | Cannera et al. | 296/65.09 |
| 5,626,391 A | | 5/1997 | Miller et al. | |
| 5,979,964 A | | 11/1999 | Ban et al. | |
| 6,135,555 A | | 10/2000 | Liu et al. | |
| 6,375,255 B1 | * | 4/2002 | Maruta et al. | 297/15 |
| 6,435,590 B1 | * | 8/2002 | Miyahara et al. | 296/65.11 |
| 6,827,394 B1 | * | 12/2004 | Watanabe et al. | 297/15 |
| 2004/0100115 A1 | * | 5/2004 | Rhodes et al. | 296/65.09 |

FOREIGN PATENT DOCUMENTS

| | | |
|---|---|---|
| GB | 2 355 180 A | 4/2001 |
| WO | WO 2004/026618 A1 | 4/2004 |
| WO | WO 2004/026619 A1 | 4/2004 |
| WO | WO 2004/026620 A1 | 4/2004 |
| WO | WO 2004/026622 A1 | 4/2004 |

* cited by examiner

*Primary Examiner*—Milton Nelson, Jr.
(74) *Attorney, Agent, or Firm*—Patrick J. Hofbauer

(57) ABSTRACT

A vehicle seat assembly for storage in a floor tub within a vehicle floor. The seat assembly includes a seat frame defining a translational axis and a longitudinal axis. The seat assembly also includes a mounting system for mounting the seat frame to the floor tub for selective rotation between a deployed design configuration and a fully tumbled stored-in-floor configuration, with the seat frame being inside the floor tub in the stored-in-floor configuration. Notably, the seat assembly further includes a lateral translation system for positive inboard displacement of the seat frame along the translational axis during the selective rotation of the seat frame from the design configuration towards the stored-in-floor configuration. In the design configuration, the medial seat axis is laterally off-set from a central tub axis defined by the floor tub. In the stored-in-floor configuration, the medial seat axis is aligned with the central tub axis.

18 Claims, 10 Drawing Sheets

VEHICLE SEAT ASSEMBLY FOR STORAGE IN A VEHICLE FLOOR TUB

FIELD OF THE INVENTION

The present invention relates to a vehicle seat assembly, and more particularly, to a vehicle seat assembly adapted for storage in a vehicle floor tub.

BACKGROUND OF THE INVENTION

Multi-seat vehicles, such as vans, minivans, sport utility vehicles, and the like, typically have second and third row vehicle seats that are placed rearwardly of the driver and front passenger's (first row) vehicle seats. In order to ready the vehicle for carrying cargo, some vehicles have heretofore been provided with second or third row seats that are storable in tubs or recesses defined within the floor of the vehicle.

Passenger vehicle mechanisms exist that provide vehicle seat assemblies with stored-in-floor functionality, whereby the backrest portion may be pivoted frontwardly to a "fold-flat" position, whereat the backrest portion substantially overlies the seat cushion portion in a generally horizontal orientation, such that the entire seat assembly may thereafter be tilted or pivotally rotated into a corresponding floor tub. In the case of, for example, a second or third row passenger seat in a minivan or the like, placing the vehicle seat assembly at its stored-in-floor configuration facilitates carriage of large or lengthy objects, such as skis or lumber, inside the vehicle.

Vehicle floor tubs are generally positioned directly fore or aft of such second or third row vehicle seat assemblies. A problem with existing stored-in-floor arrangements, however, is that the widely varying frames and underbodies of different vehicle types do not always allow for such directly fore or aft positioning of the floor tubs, and/or make same undesirable. Moreover, there are a number of situations in which it has heretofore been desirable to provide vehicles with floor tubs that are laterally offset from their respectively corresponding second or third row seats. In such situations, it has been necessary to provide vehicle seat assemblies that have lateral motion mechanisms. Manually operated and power-driven lateral motion mechanisms are known to exist. Insofar as seat assemblies provided with such mechanisms have required the user either to manually shift the seat in the lateral direction, or to independently actuate the power-drive mechanism, they have necessarily involved an extra step as compared with seat assemblies that are simply rotated into floor tubs positioned directly fore or aft of the seat. This factor is one which has tended to create extra work for the user, making it less convenient to store such vehicle seat assemblies, and has decreased the attractiveness of vehicles having such seat assemblies in the eyes of consumers. Seats provided with power-driven lateral motion mechanisms have an additional disadvantage insofar as such devices lend an increased complexity and cost to the vehicle seat design, with a concomitant increased tendency to become damaged through ordinary use or to otherwise fail at an inappropriate or inconvenient time.

As such, there is a clear need for a vehicle seat assembly that may be mounted to the floor of the vehicle in such a manner as to provide for its simple, positive and automatic lateral translation during the usual process of folding it forwardly or rearwardly into a tub formed in the vehicle floor, without any special action being required on the part of a user. Moreover, there is a need for such a vehicle seat assembly to make use of the ordinary pivotal rotation of the seat assembly into the floor tub to effect its lateral translation.

A number of further issues are of serious concern to present-day vehicle manufacturers, who demand continually higher quality content at increasingly lower prices. For example, there is a further need for the laterally translatable vehicle seat assembly to be lightweight, quiet in use, and capable of fitting into a relatively small design envelope. Additional concerns include simplicity of design, and a reasonable economy of manufacture, assembly, and installation. Such design should also provide adequate strength, durability and reliability. Further, it is desirable to provide a laterally translatable vehicle seat assembly that is easy to use, with relatively little effort being required on the part of a user in order to reach the stored-in-floor configuration.

SUMMARY OF THE INVENTION

In accordance with the present invention there is disclosed a vehicle seat assembly for storage in a floor tub within a vehicle floor. The floor tub defines a substantially longitudinal central tub axis. The seat assembly comprises a seat frame that defines a lateral translational axis and a substantially longitudinal medial seat axis. The seat assembly further comprises a mounting means for mounting the seat frame to the floor tub for selective forward pivotal rotation of the seat frame between a deployed design configuration and a fully tumbled stored-in-floor configuration. In the deployed design configuration, the medial seat axis has a first substantially horizontal orientation. In the fully tumbled stored-in-floor configuration, the seat frame is positionable within the floor tub, with the medial seat axis having a lowered, second substantially horizontal orientation. The seat assembly still further comprises a lateral translation means for positive inboard displacement of the seat frame along the lateral translational axis during the aforesaid selective forward pivotal rotation of the seat frame from the deployed design configuration towards the fully tumbled stored-in-floor configuration. In the deployed design configuration, the medial seat axis is laterally off-set from the central tub axis. In the fully tumbled stored-in-floor configuration, the medial seat axis is in substantial alignment with the central tub axis.

According to another aspect of the invention, the mounting means defines a substantially lateral first pivot axis for the selective forward pivotal rotation of the seat frame thereabout between the deployed design configuration and a raised partially tumbled storable configuration. The raised partially tumbled storable configuration is intermediate of the deployed design configuration and the fully tumbled stored-in-floor configuration. In the raised partially tumbled storable configuration, the medial seat axis is removed from the first substantially horizontal orientation and from the second substantially horizontal orientation.

According to a further aspect of the invention, the mounting means further defines a substantially lateral second pivot axis substantially parallel to the first pivot axis for the selective forward pivotal rotation of the seat frame thereabout between the deployed design configuration and the fully tumbled stored-in-floor configuration.

According to yet another aspect of the invention, the lateral translation means comprises a link member securely and diagonally interconnected between the seat frame and the mounting means for three degrees of substantially free angular adjustment of the link member relative to both the seat frame and the mounting means. As such, the forward rotation of the seat frame about the first pivot axis from the deployed design configuration towards the raised partially tumbled storable configuration causes progressively coincident inboard displacement of the seat frame along the lateral translational axis.

According to another aspect of a preferred embodiment of the invention, the lateral translation means further comprises a fixed bearing sleeve securely engaging the mounting means and a complementary tube member axially sliding within the sleeve in close frictional fit. The tube member is rigidly mounted to the seat frame, and the tube member and the sleeve are each in substantially coaxial relation to the lateral translational axis. The tube member is adapted for inboard displacement within the sleeve along the lateral translational axis during the forward rotation of the seat frame from the deployed design configuration towards the fully tumbled stored-in-floor configuration as aforesaid.

According to a further aspect of the preferred embodiment of the invention, the medial seat axis is in substantial alignment with the central tub axis in the raised partially tumbled storable configuration.

According to yet another aspect of the preferred embodiment of the invention, the lateral translational axis is substantially parallel to the first pivot axis and to the second pivot axis, and is substantially transverse to the medial seat axis and to the central tub axis.

According to a yet further aspect of the preferred embodiment of the invention, the lateral translational axis is in substantially coaxial relation to the first pivot axis. The tube member is adapted for forward pivotal rotation within the sleeve about the first pivot axis.

According to still another aspect of the preferred embodiment of the invention, the mounting means comprises a pivot rod in substantially coaxial relation to the second pivot axis. The pivot rod is mountable in the floor tub. The mounting means further comprises one or more front mounting legs, each interconnected between the pivot rod and the sleeve. As such, forward rotation of the seat frame about the second pivot axis between the deployed design configuration and the fully tumbled stored-in-floor configuration as aforesaid provides for pivotal rotation of each of the front mounting legs about the second pivot axis.

Other objectives, advantages, characteristics and features of the present invention, as well as methods of operation and functions of the related elements of the structure, and the combination of parts and economies of manufacture, will become more apparent upon consideration of the following drawings and detailed description, and the appended claims.

BRIEF DESCRIPTION OF THE DRAWINGS

The following drawings illustrate by way of example a presently preferred embodiment according to the invention. It is expressly understood, however, that the drawings are for the purpose of illustration and description only, and are not intended as a definition of the limits of the invention. In the accompanying drawings.

DETAILED DESCRIPTION OF A PREFERRED EMBODIMENT

Figure 1:
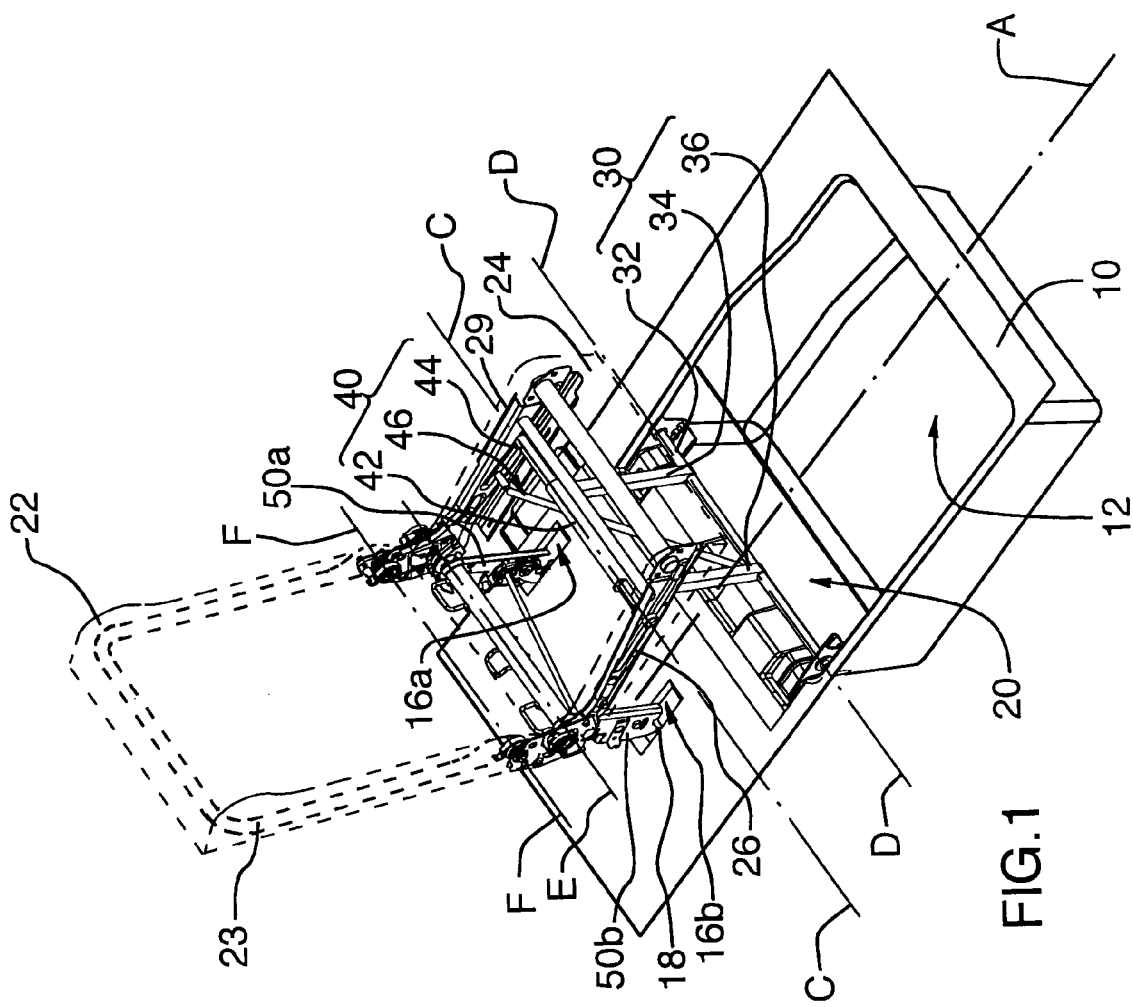
FIG. 1 is a top front left perspective view of a vehicle seat assembly for storage in a vehicle floor tub, shown in a deployed design configuration, with a seat cushion portion and a backrest portion in phantom outline.

Referring now to FIGS. 1 through 10 of the drawings, there is shown a vehicle seat assembly 20 according to the invention. The vehicle seat assembly 20 is particularly adapted for storage in a floor tub 12 defined within a vehicle floor 10. The floor tub 12 is such that it defines a substantially longitudinal central tub axis "A". Although the floor tub 12 shown in the drawings is located forwardly and inboard of the vehicle seat assembly 20 according to the invention, it will be readily apparent to those skilled in the art that such a floor tub 12 may be positioned rearwardly and outboard thereof, or in any other combination of these relative positionings, with only routine modifications that are clearly within the scope of the invention disclosed herein being necessary to be made to the structure and arrangement of components of the vehicle seat assembly 20 described hereinbelow, so as to accommodate such alternate positioning.

With specific reference to a preferred embodiment of the invention that is depicted in FIG. 1, it will be appreciated that the vehicle seat assembly 20 is of the general type having a backrest portion 22 and a seat portion 24. Cushioning and upholstery is provided in a conventional manner on each of the backrest portion 22 and the seat portion 24 to support a user (not shown). A backrest frame 23 is included within the backrest portion 22, and a seat frame 26 is included within the seat cushion portion 24. It should perhaps be noted that, while the vehicle seat assembly 20 described herein according to the invention is for storage in a floor tub 12 defined within a vehicle floor 10, the floor tub 12 and the vehicle floor 10 do not form a part of the invention, but they are referred to only as part of the cooperating environment in which the present invention may be found to have the greatest utility.

Figure 2:
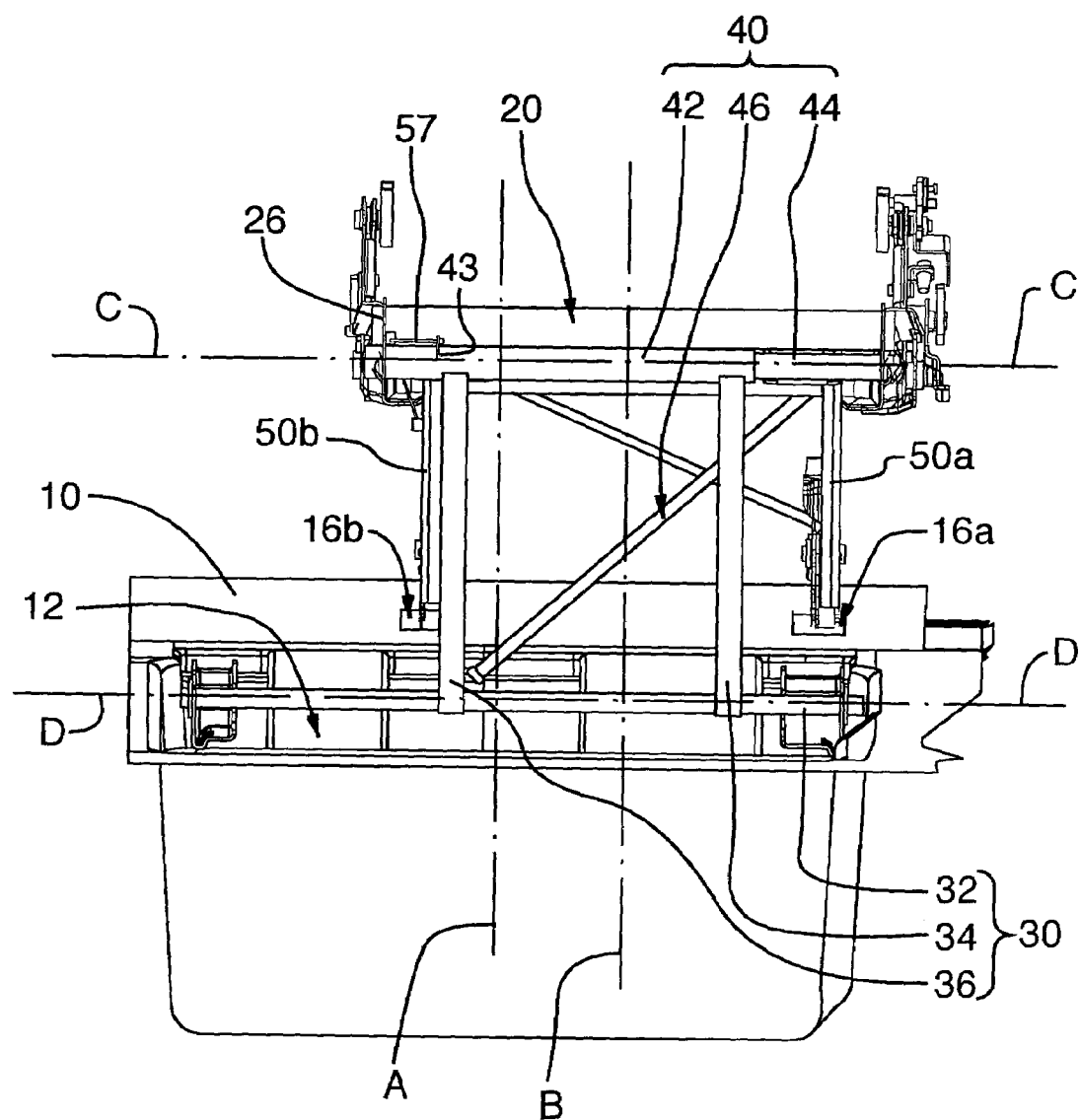
FIG. 2 is a top front perspective view of the vehicle seat assembly of FIG. 1, shown with the seat cushion portion and the backrest portion removed for clarity of illustration.
Figure 3:
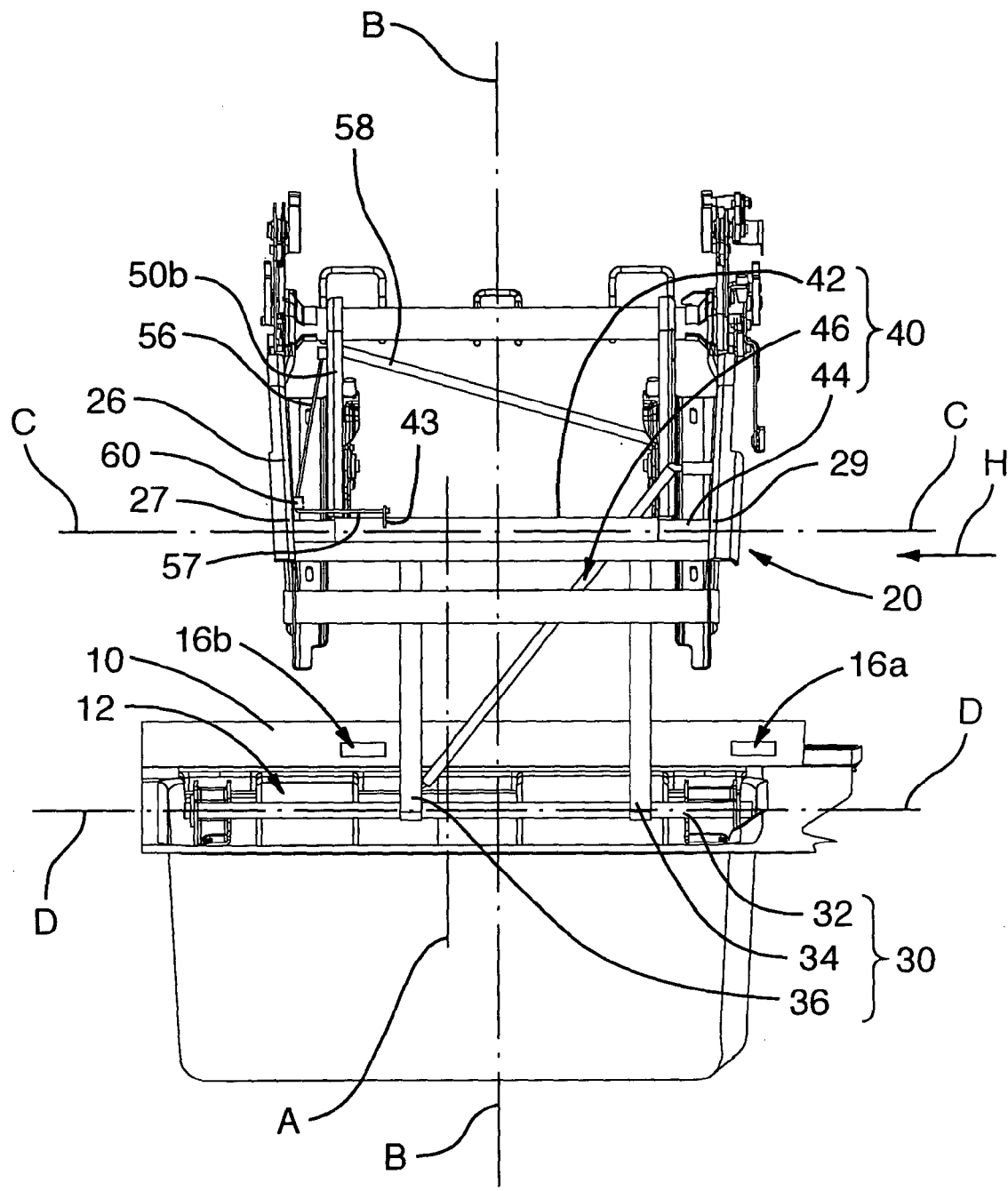
FIG. 3 is a top front perspective view of the vehicle seat assembly of FIG. 2, shown in a raised off-set configuration.

As best seen in FIGS. 2 and 3, wherein the backrest frame 23, the cushioning and upholstery of the backrest portion 22, and the seat portion 24 are not depicted for simplicity of presentation, the seat frame 26 defines a substantially lateral translational axis "C" that is substantially transverse to the central tub axis "A". The seat frame 26 also defines a substantially longitudinal medial seat axis "B" (with reference to the longitudinal axis of the vehicle (not shown)) that is substantially transverse to the lateral translational axis "C".

Figure 4:
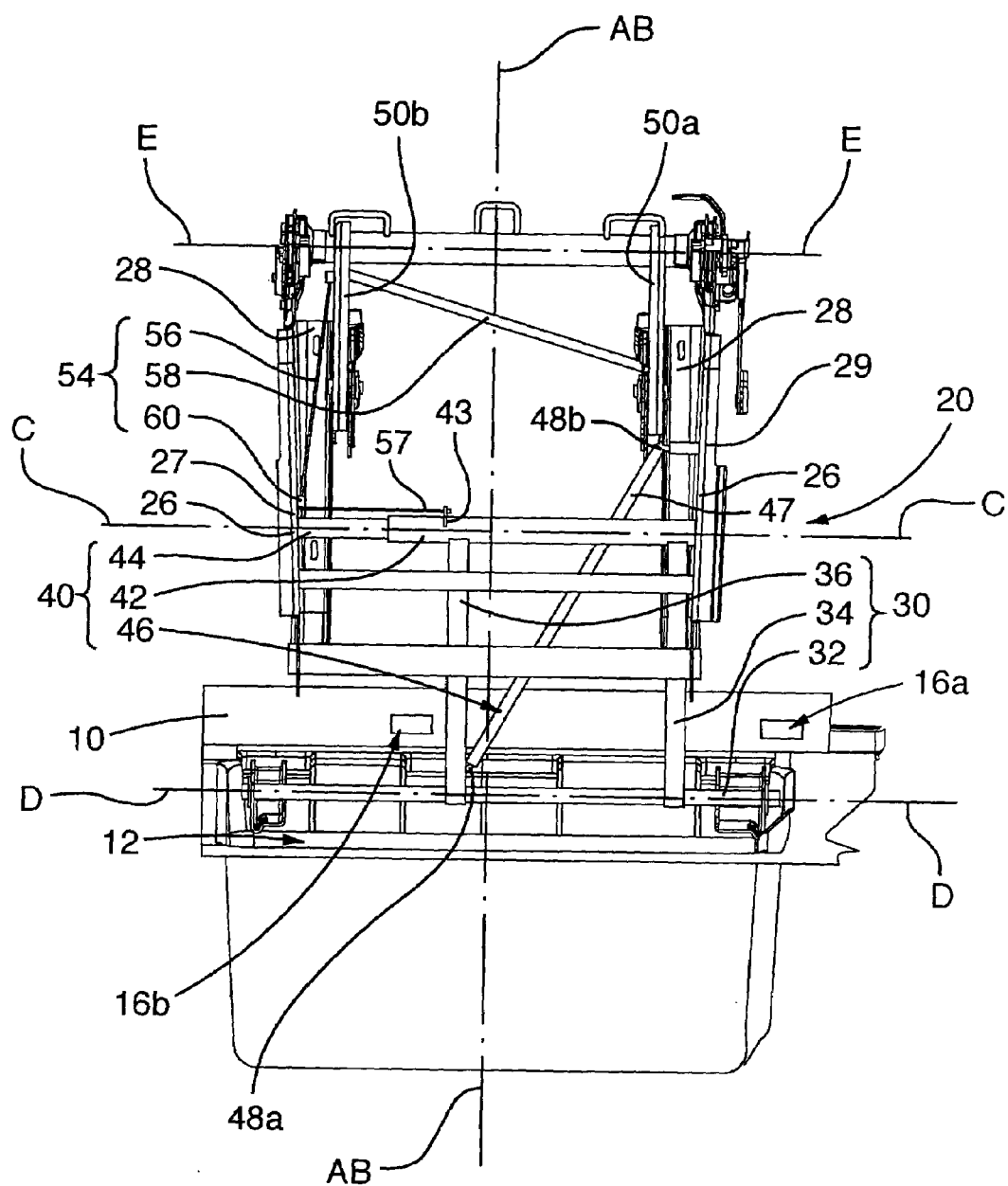
FIG. 4 is a top front perspective view of the vehicle seat assembly of FIG. 1, shown in a raised partially tumbled storable configuration, which is laterally off-set from the configuration of FIG. 3.
Figure 5:
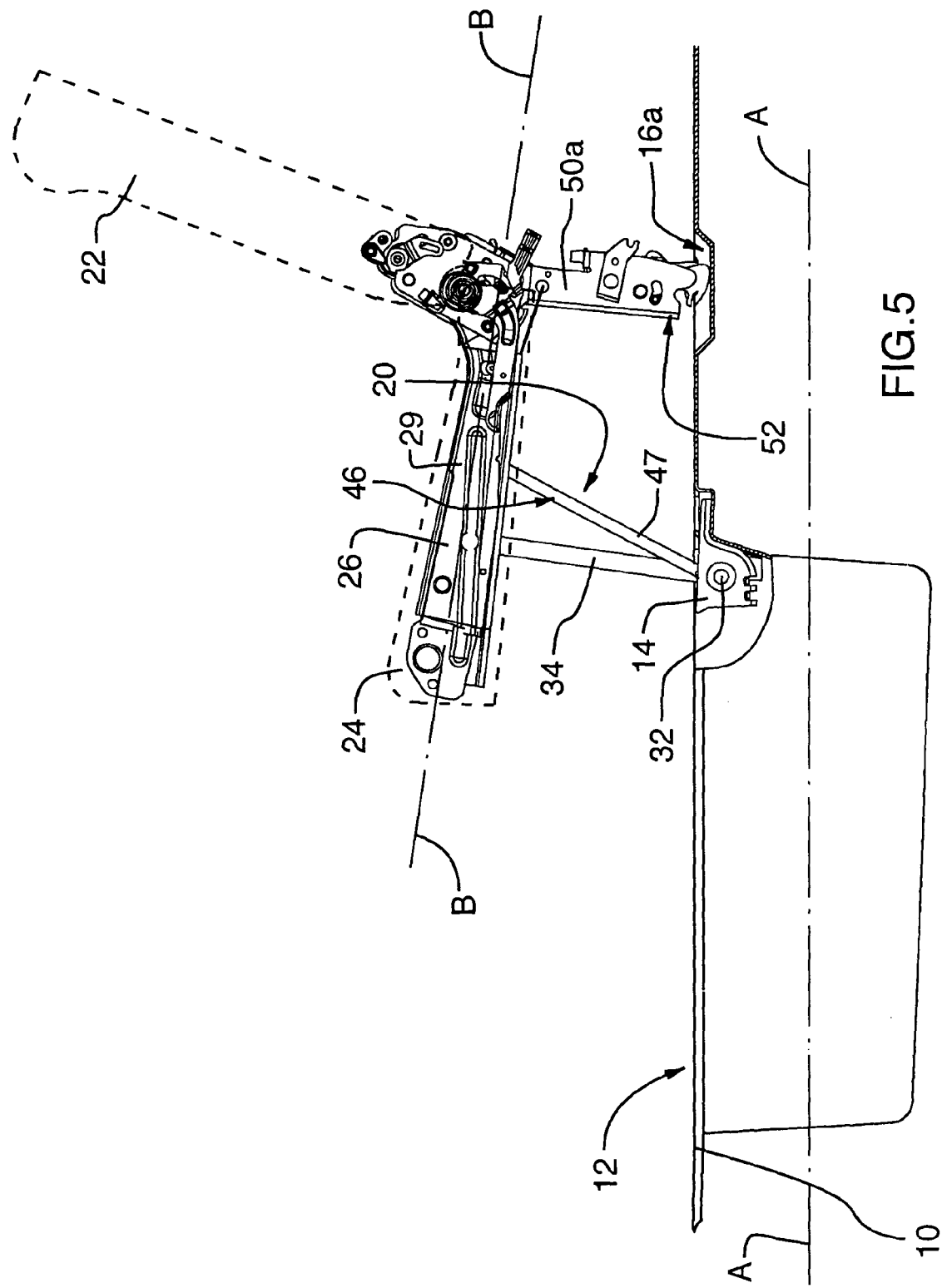
FIG. 5 is a right view of the vehicle seat assembly of FIG. 1, shown with the floor tub partially in section.
Figure 7:
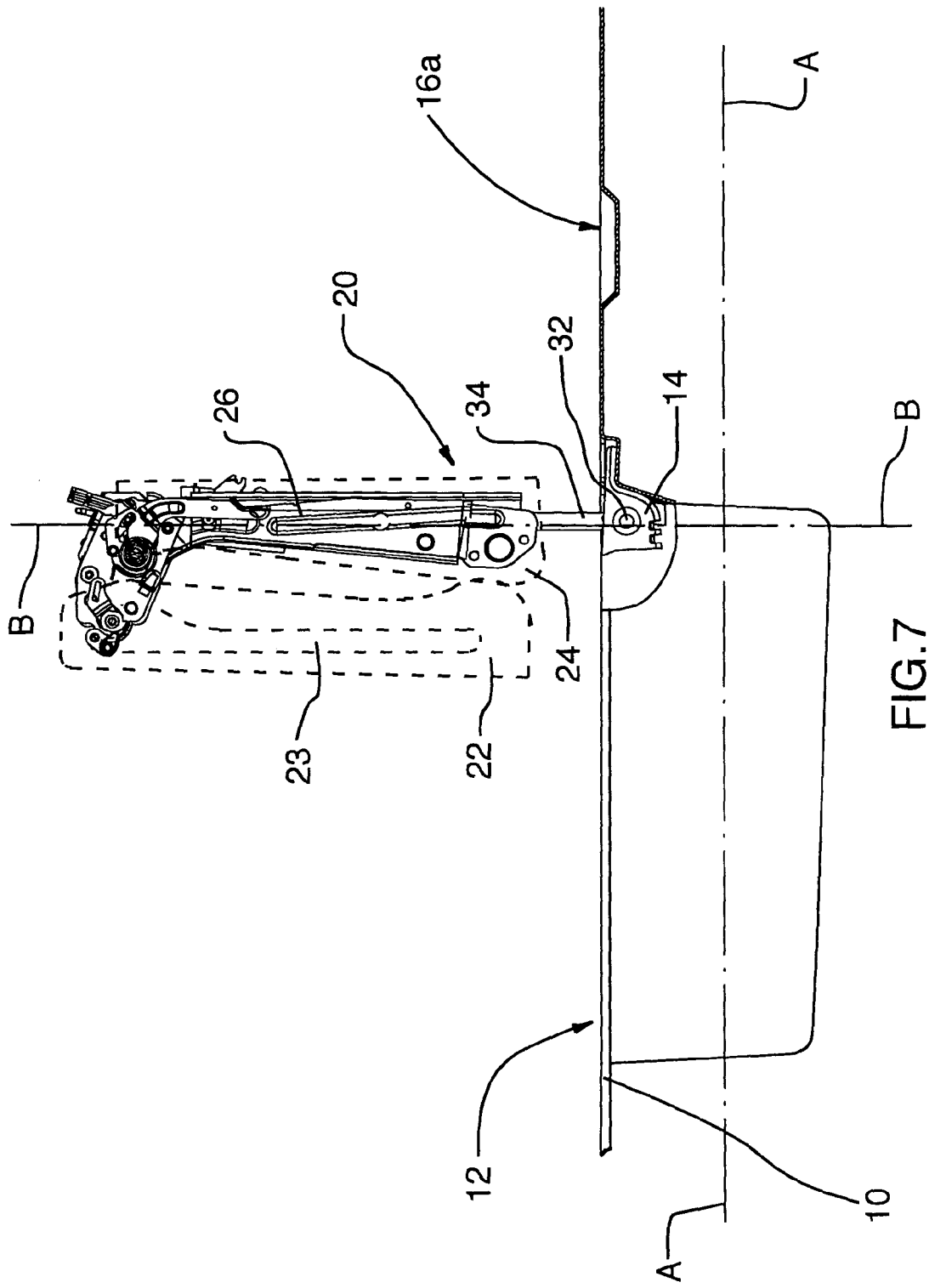
FIG. 7 is a right view of the vehicle seat assembly of FIG. 1, shown in the raised partially tumbled storable configuration (also shown in FIG. 4), with the vehicle floor tub partially in section.

The seat assembly 20 also includes a mounting means 30 for mounting the seat frame 26 to the floor tub 12. The mounting means 30 defines a substantially lateral first pivot axis that is in substantially coaxial relation to the lateral translational axis "C". The mounting means 30 enables selective forward pivotal rotation of the seat frame 26 about the lateral translational axis "C" from a deployed design configuration (as shown in FIGS. 1, 2 and 5), through a raised partially tumbled storable configuration (shown in FIGS. 4, 7 and 9), and there on to a fully tumbled stored-in-floor configuration (shown in FIG. 10). In the deployed design configuration, and as best seen in FIG. 5, the medial seat axis "B" has a first substantially horizontal orientation and is substantially parallel to the central tub axis "A". In the raised partially tumbled storable configuration, and as best seen in FIG. 7, the medial seat axis "B" is removed from the first substantially horizontal orientation and has a substantially vertical seat orientation. In the fully tumbled stored-in-floor configuration, shown in FIG. 10, the seat frame 26 is positioned within the floor tub 12, and the medial seat axis "B" has a lowered, second substantially horizontal orientation. Additionally, the mounting means 30 of the vehicle seat assembly 20 defines a substantially lateral second pivot axis "D" that is substantially parallel to the lateral translational axis "B". Broadly, and in addition to any aforesaid functionality, the mounting means 30 also enables selective forward pivotal rotation of the seat frame 26 about the second pivot axis "D" between the deployed design configuration and the fully tumbled stored-in-floor configuration (shown in FIG. 10).

According to the invention, the seat assembly 20 also includes a lateral translation means 40 that enables positive inboard displacement of the seat frame 26 along the lateral translational axis "C" during said selective forward rotation of the seat frame 26 from the deployed design configuration towards the tumbled stored-in-floor configuration. In the deployed design configuration, and as best seen in FIG. 2, the medial seat axis "B" is laterally off-set from the central tub axis "A". As will be appreciated from FIGS. 2, 3, 4 and 10, the medial seat axis "B" moves towards substantial alignment with the central tub axis "A" as the seat frame 26 is rotated from the deployed design configuration (as best seen in FIG. 2), through a raised off-set configuration (shown in FIGS. 3, 6 and 8), and through the raised partially tumbled storable configuration (as best seen in FIG. 4), towards the fully tumbled stored-in-floor configuration (shown in FIG. 10). As such, the axes "A" and "B" are substantially coaxial (as indicated by reference line AB—AB in the drawings), and the medial seat axis "B" has attained the aforesaid lowered, second substantially horizontal orientation, by the time the seat frame 26 is in the fully tumbled stored-in-floor configuration of FIG. 10. In fact, in the preferred embodiment illustrated (and as best seen in FIG. 4), substantial alignment of the axes "A" and "B" has taken place by the time the seat frame 26 reaches the raised partially tumbled storable configuration shown in FIGS. 4 and 9.

In the preferred embodiment shown in the drawings, the lateral translation means 40 includes a link member 46 that is securely and diagonally interconnected between the seat frame 26 and the mounting means 30. The link member 46 preferably includes a rod member 47 securely and diagonally interconnected as aforesaid by means of a first ball joint 48a and a second ball joint 48b positioned one each at opposite ends of the rod member 47, so as to provide the link member 46 with three degrees of substantially free angular adjustment relative to both the seat frame 26 and the mounting means 30. According to the preferred embodiment of the invention, forward rotation of the seat frame 26 about the lateral translational axis "B" from the deployed design configuration towards the raised partially tumbled storable configuration is progressively coincident with inboard displacement of the seat frame along the lateral translational axis "C". In the preferred embodiment illustrated, the second ball joint 48b is operatively connected to an outboard portion 29 of the seat frame 26, and the first ball joint 48a is operatively connected to the mounting means 30 (as described in further detail hereinbelow), so as to securely and diagonally interconnect the link member 46 as aforesaid between the seat frame 26 and the mounting means 30.

The lateral translation means 40 also includes a fixed bearing sleeve 42 securely engaging the mounting means 30 and a complementary tube member 44 axially sliding within the sleeve 42 in close frictional fit. The tube member 44 is rigidly mounted to the seat frame 26, and each of the tube member 44 and the sleeve 42 is in substantially coaxial relation to the lateral translational axis "C". The tube member 44 is adapted for inboard displacement (in the direction of arrow "H" in FIGS. 3 and 8) within the sleeve 42 along the lateral translational axis "C", and for forward pivotal rotation within the sleeve 42 about the lateral translational axis "C", during forward rotation of the seat frame 26 from the deployed design configuration towards the fully tumbled stored-in-floor configuration. In fact, in the preferred embodiment illustrated in the drawings, the tube member 44 has substantially completed its inboard displacement and forward pivotal rotation within the sleeve 42 (as best seen in FIGS. 4 and 7), by the time the seat frame 26 has reached the raised partially tumbled storable configuration.

Figure 8:
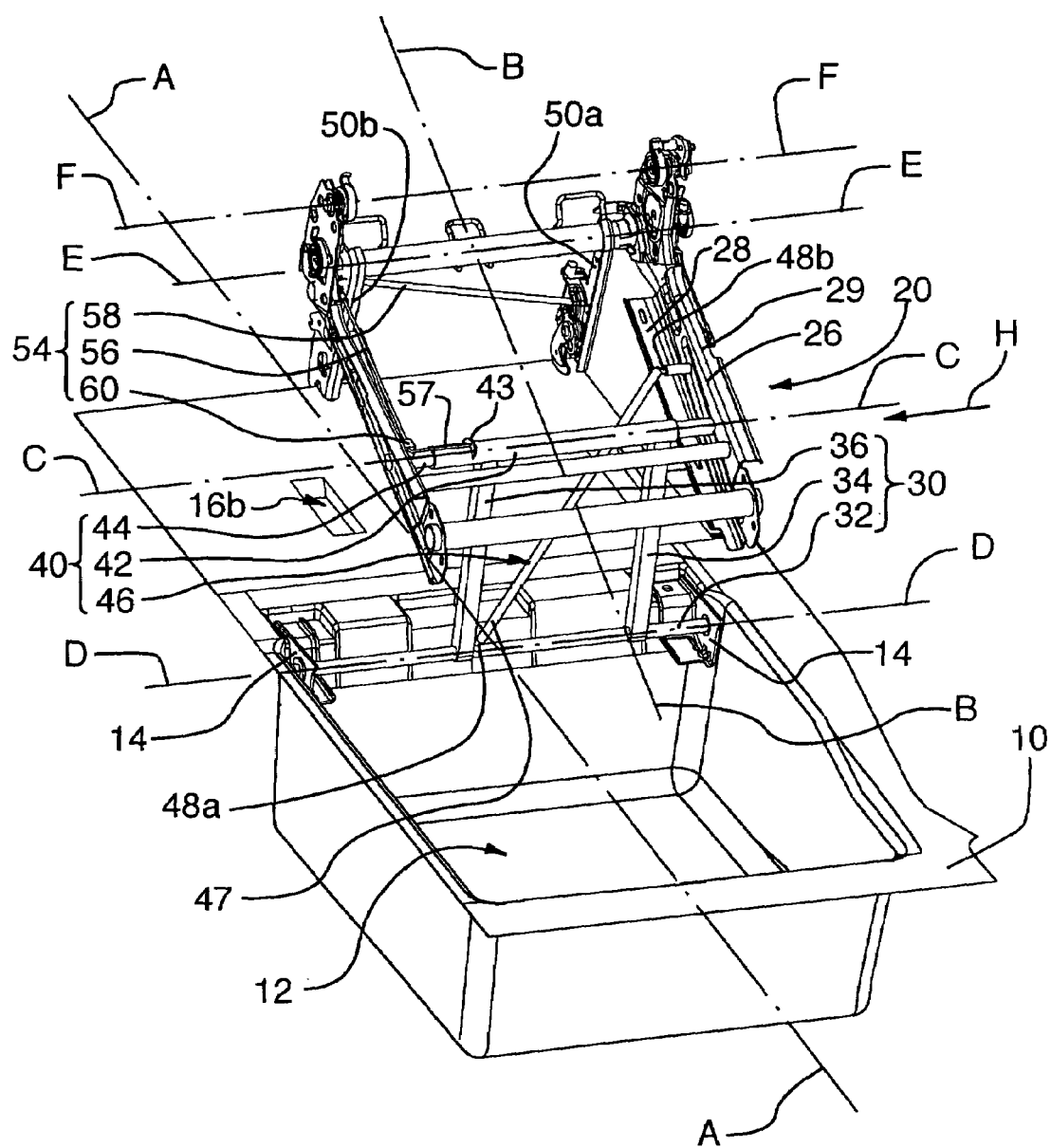
FIG. 8 is a top front left perspective view of the vehicle seat assembly of FIG. 1 shown in the same configuration as FIG. 3.

In the preferred embodiment of the invention shown in the drawings, the mounting means 30 includes a pivot rod 32 in substantially coaxial relation to the second pivot axis "D". As best seen in FIG. 8, the pivot rod 32 is adapted for secure attachment to opposing tub brackets 14, 14 that are rigidly mounted within the floor tub 12 by welding or the like. With further reference inter alia to FIG. 8, the mounting means 30 additionally preferably includes a first front mounting leg 34 and a second front mounting leg 36, each securely interconnected between the pivot rod 32 and the sleeve 42. The second front mounting leg 36 is laterally off-set from the first front mounting leg 34 along the second pivot axis "D" and is operatively connected to the first ball joint 48a of the link member 46, so as to securely and diagonally interconnect the link member 46 as aforesaid between the seat frame 26 and the mounting means 30. As will be appreciated from FIGS. 9 and 10, the pivot rod 32 pivotally rotates, together with the front mounting legs 34, 36, about the second pivot axis "D" when the seat frame 26 is forwardly rotated about the second pivot axis "D" from the deployed design configuration (shown, inter alia, in FIGS. 1 and 5), through the raised partially tumbled storable configuration (shown, inter alia, in FIG. 9), towards the fully tumbled stored-in-floor configuration (shown in FIG. 10). In an alternate embodiment (not shown) that does not depart from the spirit and scope of the invention, which is of course limited only by the accompanying claims, the pivot rod may be stationary, and the front mounting legs might rotate about the pivot rod whilst also rotating about the second pivot axis "D".

As best seen in FIG. 8, the vehicle seat assembly 20 additionally preferably includes a first rear mounting leg 50a and a second rear mounting leg 50b, each pivotally mounted on the seat frame 26. As best appreciated from FIG. 6, the rear mounting legs 50a, 50b each have a conventional releasable locking means 52 for selective attachment to a first rear leg tub 16a and to a second rear leg tub 16b respectively. Both of the first and second rear leg tubs 16a, 16b are defined within the vehicle floor 10, and each one has a respective striker pin 18 (best seen in FIG. 1) rigidly attached thereto, by welding or the like. In the deployed design configuration, the releasable locking means 52, shown in the drawings as a locking hook, is used to securely attach each of the rear mounting legs 50a, 50b to the striker pin 18 located within the respective one of the leg tubs 16a, 16b. Any suitable releasable locking means 52 may be used according to the present invention, such as, for example, the arrangement disclosed in issued U.S. Pat. No. 5,626,391 (Miller et al.) for a Uptiltable Rear Vehicle Seat Assembly, the teachings of which patent are incorporated herein by reference.

The rear mounting legs 50a, 50b together define a substantially lateral rear leg pivot axis "E" that is substantially parallel to the lateral translational axis "C". The second rear mounting leg 50b is laterally off-set from the first rear mounting leg 50a along the lateral rear leg pivot axis "E" (as shown, inter alia, in FIGS. 1 and 10). The rear mounting legs 50a, 50b are each selectively and pivotably retractable about the lateral rear leg pivot axis "E" relative to the seat frame 26 as the seat frame 26 is rotated as aforesaid between the deployed design configuration and the fully tumbled stored-in-floor configuration. In the fully tumbled stored-in-floor configuration, the rear mounting legs 50a, 50b are in a fully retracted position whereat they are substantially aligned with the seat frame (as shown in FIG. 10). In fact, in the preferred embodiment illustrated (and as best seen in FIGS. 7 and 9), the rear mounting legs 50a, 50b reach the fully retracted position by the time the seat frame 26 obtains the raised partially tumbled storable configuration.

Figure 9:
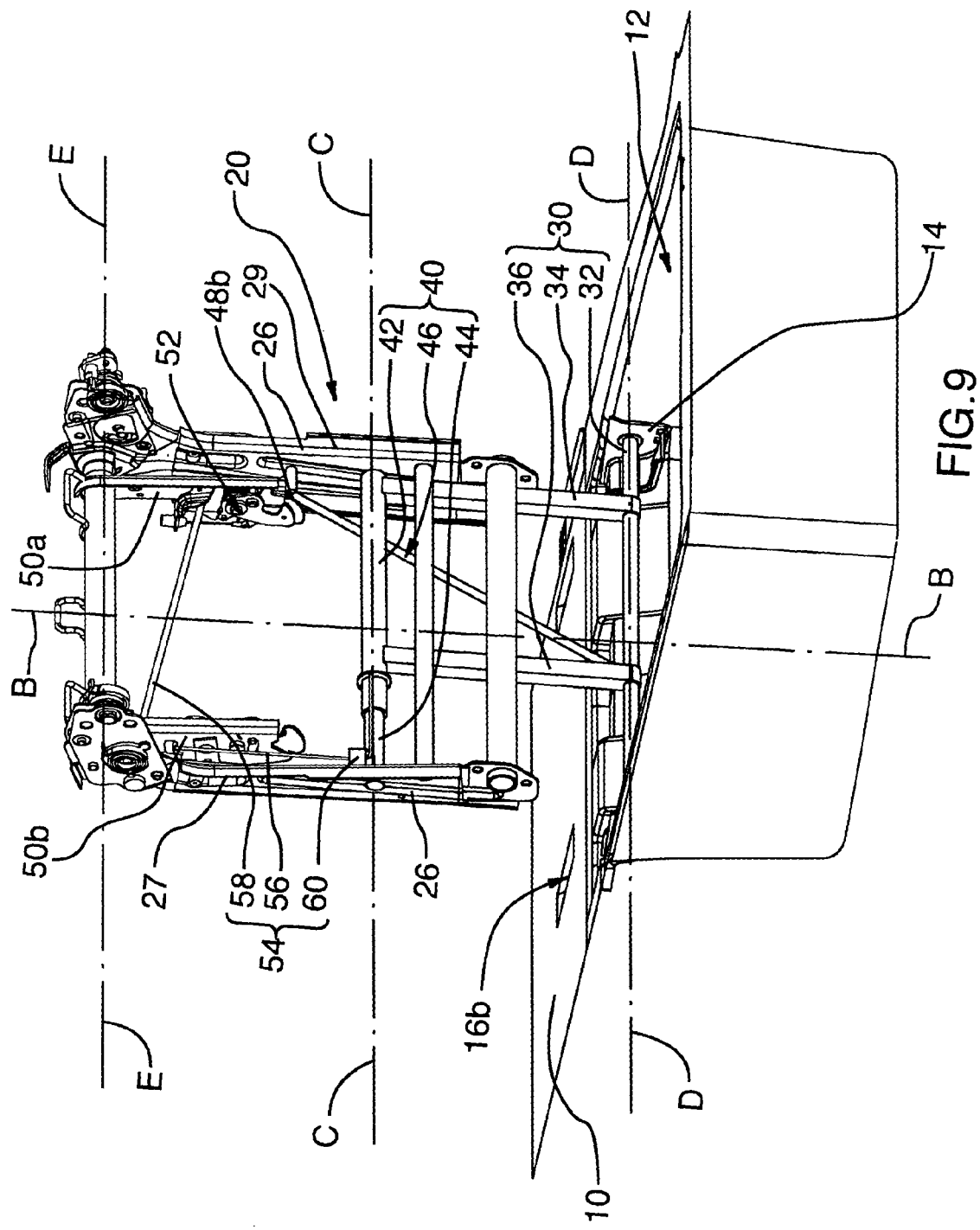
FIG. 9 is a top front left perspective view of the vehicle seat assembly of FIG. 1 shown in the same configuration as FIG. 4.
Figure 10:
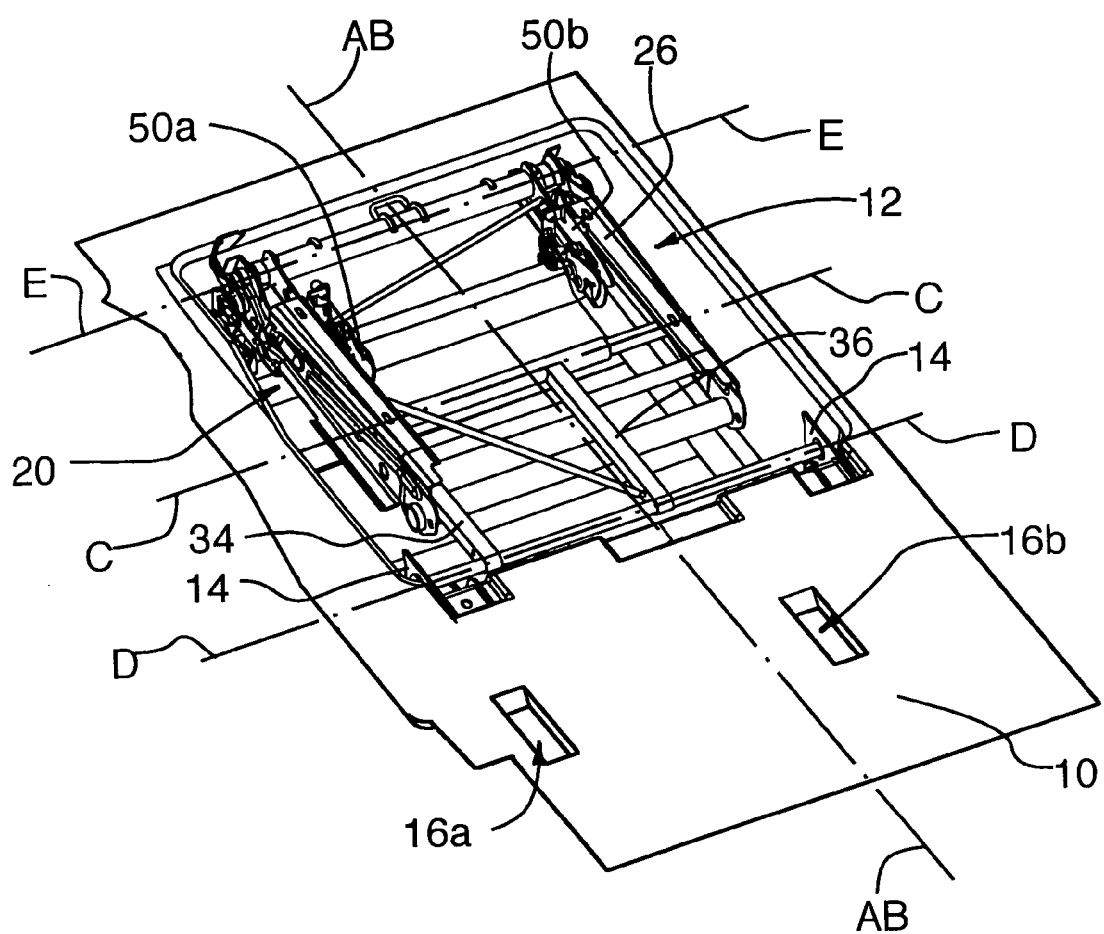
FIG. 10 is a top back right perspective view of the vehicle seat assembly of FIG. 1, shown in a fully tumbled stored-in-floor configuration.

In the preferred embodiment of the invention shown in the drawings, and as best seen in FIGS. 8 and 9, the vehicle seat assembly 20 optionally includes a rear leg folding means 54 that operatively engages the lateral translation means 40 for positive pivotal retraction of the rear mounting legs 50a, 50b as aforesaid, about the lateral rear leg pivot axis "E", during the aforesaid rotation of the seat frame 26 between the deployed design configuration (shown, inter alia, in FIG. 5) and the fully tumbled stored-in-floor configuration (shown in FIG. 10). In the preferred embodiment illustrated (and as best seen in FIGS. 4, 8 and 9), the rear leg folding means 54 is further adapted to maintain the rear mounting legs 50a, 50b in a substantially vertical leg orientation during the aforesaid rotation of the seat frame 26 between the deployed design configuration (shown, inter alia, in FIG. 5) and the raised partially tumbled storable configuration (best seen in FIG. 9).

According to the invention, and as shown in the drawings, the rear leg folding means 54 may include a conventional Bowden type cable arrangement, wherein a movable inner wire 57 is surrounded by a protective outer concentric sheath 56. In this embodiment of the rear leg folding means 54, and as best seen in FIGS. 3 and 4, the movable inner wire 57 is interconnected between the first rear mounting leg 50a and a mounting bracket 43 on the sleeve 42. The sheath 56 is fixedly mounted by a cable mounting bracket 60, or other suitable mounting means, on an inboard portion 27 of the seat frame 26. The movable inner wire 57 and the outer concentric sheath 56 pass from the mounting bracket 43, around the cable mounting bracket 60, over a support plate portion 28 of the seat frame 26, to the first rear mounting leg 50a.

The rear leg folding means 54 also includes a slave tube member 58 that is rigidly interconnected between the first rear mounting leg 50a and the second rear mounting leg 50b, to cause positive pivotal retraction of the second rear mounting leg 50b in unison with positive pivotal retraction of the first rear mounting leg 50a during the aforesaid rotation of the seat frame 26 between the deployed design configuration and the fully tumbled stored-in-floor configuration. The first rear mounting leg 50a and the second rear mounting leg 50b are biased, in the direction of arrow "G" in FIG. 6, towards a substantially extended leg orientation by any suitable biasing means (not shown), such as, for example, a spring member.

Figure 6:
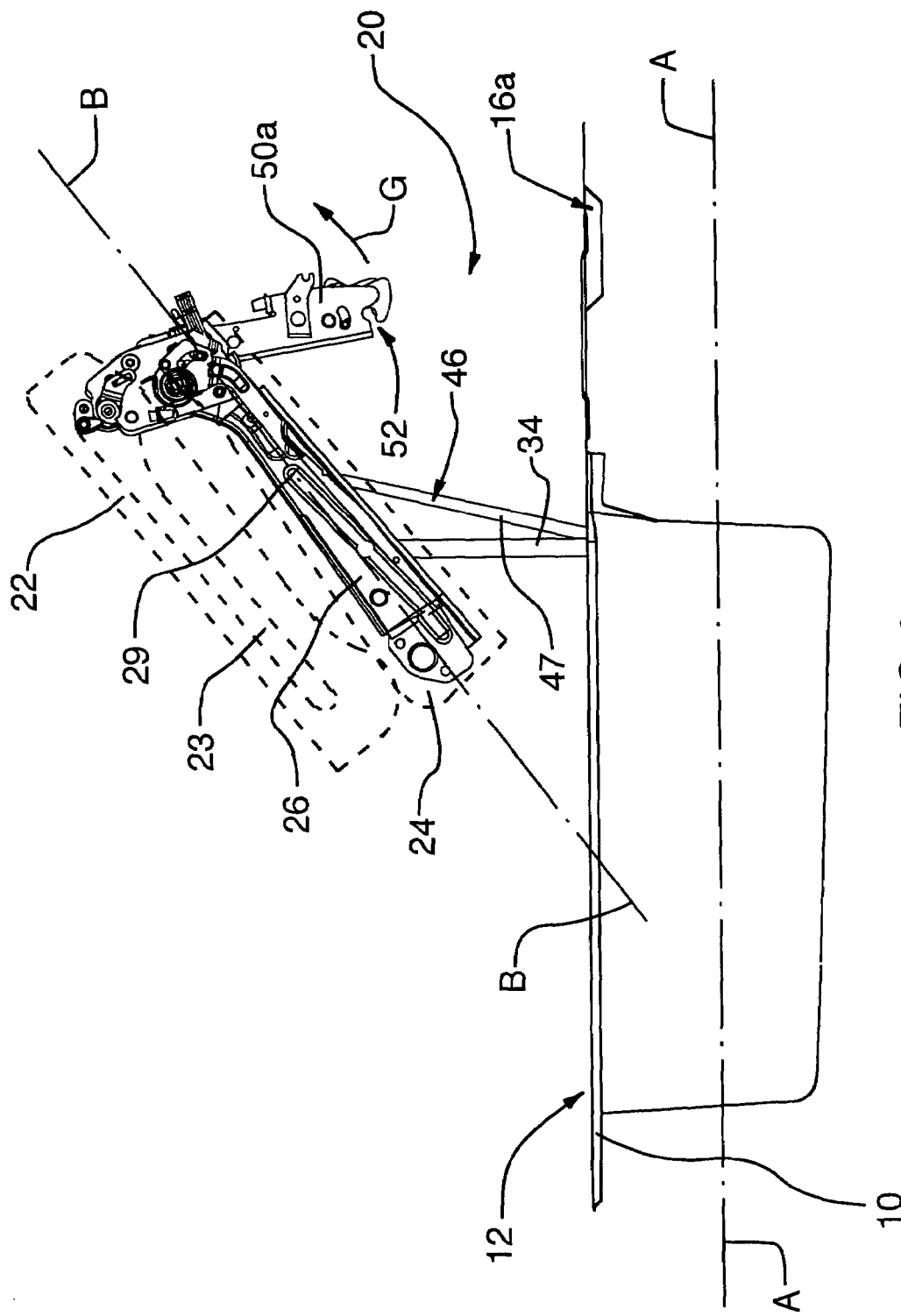
FIG. 6 is a right view of the vehicle seat assembly of FIG. 1, shown in the raised off-set configuration (also shown in FIG. 3)

In order to provide adequate structural stability and safety for a seat assembly occupant (not shown), the rear mounting legs 50a, 50b are typically provided with a suitable form of releasable rotation locking means (not shown), which is capable of locking the rear mounting legs 50a, 50b in the substantially vertical leg orientation when the seat frame is in the deployed design configuration (shown in FIGS. 1, 2 and 5), so as to inhibit their rotation about the rear leg pivot axis "E" in such configuration, whether such rotation is in the direction of arrow "G" in FIG. 6 or in a direction that is substantially opposed thereto. The releasable rotation locking means may be simultaneously released with release of the locking means 52 in a known manner, so as to enable rotation of the rear mounting legs 50a, 50b about the rear leg pivot axis "E".

According to the invention, a variety of other suitable rear leg folding means 54 may be substituted for the arrangement described hereinabove. For example, U.S. Pat. No. 6,135,555 (Liu) discloses a mechanism for retracting the rear legs of a vehicle seat assembly, and such design may be easily adapted by persons skilled in the art, in light of the disclosures made hereinabove, so as to make minor modifications that are well within the scope of ordinary workshop improvements, and so as to provide a design that automatically retracts the rear mounting legs 50a, 50b to the fully retracted position, whereat the rear mounting legs 50a, 50b are substantially aligned as aforesaid with the seat frame 26, upon said selective pivotal rotation of the vehicle seat assembly 20 to the fully tumbled stored-in-floor configuration.

In use, and as aforesaid, the pivot rod 32 is already mounted for rotation within the floor tub 12, and the vehicle seat assembly 20 is initially positioned in the deployed design configuration, with the first and second rear mounting legs 50a, 50b securely attached to the striker pins 18 positioned within the respective first and second rear leg tubs 16a, 16b by way of the releasable locking means 52. Initially, and as may be best appreciated from a consideration of FIGS. 1 and 6, the backrest portion 22 may be forwardly folded over the seat portion 24 about a lateral backrest folding axis "F" that is substantially parallel to the lateral translational axis "C" and the second pivot axis "D". Any suitable backrest latching means (not shown) may be activated to facilitate such forward folding of the backrest portion 22.

With the backrest portion 22 folded over the seat portion 24, the locking means 52 may be easily released, and the seat frame 26 may thereafter be forwardly and pivotally rotated about the lateral translational axis "C" from the deployed design configuration (as shown in FIGS. 1, 2 and 5) towards the raised partially tumbled storable configuration (as shown in FIGS. 4, 7 and 9), such that the medial seat axis "B" moves from the first substantially horizontal orientation (best seen in FIG. 5) towards the substantially vertical seat orientation (best seen in FIG. 7). With this rotation of the seat assembly 20, and with the link member 46 moving in substantially free angular adjustment relative to both the seat frame 26 and the mounting means 30, as aforesaid, the tube member 44 attached to the seat frame 26 is displaced in an inboard direction (i.e., in the direction of arrow "H" in FIGS. 3 and 8) within the sleeve 42 along the lateral translational axis "C", whilst also forwardly and pivotally rotating therewithin about the lateral translational axis "C". It will also be appreciated that, with the aforesaid inboard displacement, a first end of the movable inner wire 57 that is attached to the mounting bracket 43 on the fixed bearing sleeve 42 (as aforesaid) will stay in a fixed position, such that the opposite second end of the movable inner wire 57 pulls on the first and second rear mounting legs 50a, 50b, causing their retraction about the lateral rear leg pivot axis "E", in a direction substantially opposite to the bias direction of arrow "G" in FIG. 6.

Accordingly, positive inboard displacement of the seat frame 20 along the lateral translational axis "C", in the direction of arrow "H" in FIGS. 3 and 8, is progressively coincident with rotation of the seat frame 26 about the lateral translational axis "C". Likewise, coincident with such inboard displacement, the medial seat axis "B" moves from an initial position laterally off-set from the central tub axis "A" (as seen in FIG. 2) to one in which it is substantially aligned therewith (as indicated by reference line AB—AB in FIG. 4). As will be appreciated from the foregoing, upon said rotation of the seat frame 26 about the lateral translational axis "C", the rear leg folding means 54 simultaneously effects positive pivotal retraction of the first and second rear mounting legs 50a, 50b about the rear leg pivot axis "E" to maintain the substantially vertical leg orientation (best seen in FIG. 8) during rotation of the seat frame 26 from the deployed design configuration towards the raised partially tumbled storable configuration (best seen in FIG. 9).

The seat frame 26 is then selectively, forwardly, and pivotally rotated by a user (not shown) about the second pivot axis "D" from the raised partially tumbled storable configuration towards the fully tumbled stored-in-floor configuration (shown in FIG. 10), such that the seat frame 26 is positioned within the floor tub 12, with the medial seat axis "B" having obtained the lowered, second substantially horizontal orientation as aforesaid, coincident with the floor tub axis "A".

It will be appreciated from the above, that the vehicle seat assembly 20 according to the present invention may be mounted to the vehicle floor 10 in such a manner as to provide for its simple, positive and automatic lateral translation during the usual process of folding it forwardly into the floor tub 12, without any special action being required on the part of a user. It will also be noted that the vehicle seat assembly 20 according to the present invention makes use of the ordinary pivotal rotation of the seat assembly 20 into the floor tub 12 to effect its lateral translation. As well, the vehicle seat assembly 20 is relatively lightweight and quiet in use, and is capable of fitting into a relatively small design envelope. It also will be seen to have a simple design, with a correspondingly low economy of manufacture, assembly, and installation. Thus, the vehicle seat assembly 20 according to the present invention provides adequate strength, durability and reliability and is easy to use, with relatively little effort being required on the part of a user (not shown) in order to reach the fully tumbled stored-in-floor configuration.

Other modifications and alterations may be used in the design and manufacture of the vehicle seat assembly 20 according to the present invention without departing from the spirit and scope of the invention, which is limited only by the accompanying claims. For example, the lateral first pivot axis need not be in substantially coaxial relation to the lateral translational axis "C", such that the seat frame 26 might be laterally displaced along a different axis than that about which it may be rotated. Likewise, the lateral translational axis "C" might not extend in a substantially lateral direction, but might instead extend in an alternate direction that notionally includes the lateral direction as a mere component direction thereof, such that inboard displacement of the seat frame 26 will also be progressively coincident with displacement in a fore or aft direction. Additionally, it will be appreciated that the medial seat axis "B" may have more or less of a degree of horizontal orientation in the deployed design configuration and the fully tumbled stored-in-floor configuration, and more or less of a degree of vertical orientation in the raised partially tumbled storable configuration, than that shown in the drawings. As well, the seat frame 26 might be displaced along the lateral translational axis during a longer or shorter portion of its total period of travel between the deployed design configuration and the fully tumbled stored-in-floor configuration. Further, rotation of the seat frame about the first pivot axis need not be progressively coincident with lateral displacement along the lateral translational axis, but might instead be staged in a series of discrete steps.

In a still further example of a modification that is within the scope of the present invention, the fixed bearing sleeve 42 might securely engage the seat frame 26, with the complementary tube member 44 rigidly mounted to the mounting means 30, instead of the other way around. Alternately, a tongue and groove type arrangement may be provided in place of the tube member 44 and the bearing sleeve 42 of the lateral translation means 40. Additionally, the mounting means 30 might enable selective forward pivotal rotation of the seat frame 26 about the second pivot axis "D" from a raised configuration of the seat assembly 20 that is not yet storable, insofar as such modification would require further lateral translation of the seat frame 26 during travel toward the fully tumbled stored-in-floor configuration. Of course, the mounting means 30 might include more or less than two front mounting legs 34, 36, and the seat assembly 20 might include more or less than two rear mounting legs 50a, 50b.

Likewise, the first ball joint 48a might instead securely engage the first front mounting leg 34 rather than the second front mounting leg 36, and the second ball joint 48b might securely engage the inboard portion 27 of the seat frame 26 rather than the outboard portion 29. It should be noted that the first and second ball joints 48a, 48b might be replaced by other universal-type joints, or by any other form of movable connection means which allows an adequate range of motion, as aforesaid. As well, the vehicle seat assembly 20 might be provided without the rear leg folding means 54, instead requiring the manual rotation of the first and second rear mounting leg 50a, 50b about the lateral rear leg pivot axis "E" after rotation of the seat frame 26 from the deployed design configuration. The movable inner wire 57 of the Bowden-type cable might be connected to a mounting bracket on the tube member 44 instead of on the sleeve 42, and the outer concentric sheath 56 might be fixedly mounted to the outboard portion 29 of the seat frame 26 rather than to inboard portion 27. The first and second rear mounting legs 50a, 50b might also be biased, in a direction substantially opposed to arrow "G" in FIG. 6, away from the substantially extended leg orientation. Additionally, it will be appreciated that the first and second rear mounting legs 50a, 50b may be maintained in a more or less substantially vertical orientation by the rear leg folding means 54, than that shown in the drawings. Given the great number of example modifications discussed above, it should perhaps be noted once again that other routine modifications and alterations may be used in the design and manufacture of the vehicle seat assembly 20 according to the present invention without departing from the spirit and scope of the invention, which is of course limited only by the accompanying claims.

I claim:

1. A vehicle seat assembly for storage in a floor tub within a vehicle floor, said floor tub defining a substantially longitudinal central tub axis, said seat assembly comprising:
    (a) a seat frame defining a lateral translational axis and a substantially longitudinal medial seat axis;
    (b) a mounting means for mounting said seat frame to said floor tub for selective forward pivotal rotation of said seat frame, in a mounted configuration, between a deployed design configuration and a fully tumbled stored-in-floor configuration; in said deployed design configuration, said medial seat axis having a first substantially horizontal orientation; in said fully tumbled stored-in-floor configuration, said seat frame being positionable within said floor tub with said medial seat axis having a lowered, second substantially horizontal orientation; and
    (c) a lateral translation means for positive inboard displacement of said seat frame along said lateral translational axis during said selective forward pivotal rotation of said seat frame from said deployed design configuration towards said fully tumbled stored-in-floor configuration; in said deployed design configuration, said medial seat axis is adapted to be laterally off-set from said central tub axis when said seat frame is in said mounted configuration; in said fully tumbled stored-in-floor configuration, said medial seat axis being adapted for substantial alignment with said central tub axis when said seat frame is in said mounted configuration;
    wherein said mounting means defines a substantially lateral first pivot axis for said selective forward pivotal rotation of said seat frame thereabout between said deployed design configuration and a raised partially tumbled storable configuration, said raised partially tumbled storable configuration being intermediate of said deployed design configuration and said fully tumbled stored-in-floor configuration; in said raised partially tumbled storable configuration, said medial seat axis being removed from said first substantially horizontal orientation and from said second substantially horizontal orientation;
    wherein said lateral translation means comprises a link member securely and diagonally interconnected between said seat frame and said mounting means for three degrees of substantially free angular adjustment of said link member relative to both said seat frame and said mounting means, such that said forward rotation of said seat frame about said first pivot axis from said deployed design configuration towards said raised partially tumbled storable configuration causes progressively coincident inboard displacement of said seat frame along said lateral translational axis; and
    wherein said lateral translation means further comprises a fixed bearing sleeve securely engaging said mounting means and a complementary tube member axially sliding within said sleeve in close frictional fit, with said tube member being rigidly mounted to said seat frame, with said tube member and said sleeve each being in substantially coaxial relation to said lateral translational axis, and with said tube member being adapted for inboard displacement within said sleeve along said lateral translational axis during said forward rotation of said seat frame from said deployed design configuration towards said fully tumbled stored-in-floor configuration.

2. A vehicle seat assembly according to claim 1, wherein said mounting means further defines a substantially lateral second pivot axis substantially parallel to said first pivot axis for said selective forward pivotal rotation of said seat frame thereabout between said deployed design configuration and said fully tumbled stored-in-floor configuration.

3. A vehicle seat assembly according to claim 2, wherein, in said raised partially tumbled storable configuration, said medial seat axis is adapted for substantial alignment with said central tub axis when said seat frame is in said mounted configuration.

4. A vehicle seat assembly according to claim 3, wherein said lateral translational axis is substantially parallel to said first pivot axis and to said second pivot axis, and is adapted to be substantially transverse to said medial seat axis and to said central tub axis when said seat frame is in said mounted configuration.

5. A vehicle seat assembly according to claim 4, wherein said lateral translational axis is in substantially coaxial relation to said first pivot axis, with said tube member being adapted for forward pivotal rotation within said sleeve about said first pivot axis.

6. A vehicle seat assembly according to claim 5, wherein said mounting means comprises a pivot rod in substantially coaxial relation to said second pivot axis, with said pivot rod being mountable in said floor tub, and wherein said mounting means further comprises one or more front mounting legs each interconnected between said pivot rod and said sleeve, such that said forward rotation of said seat frame about said second pivot axis between said deployed design configuration and said fully tumbled stored-in-floor configuration provides for pivotal rotation of each of said front mounting legs about said second pivot axis.

7. A vehicle seat assembly according to claim 6, further comprising one or more rear mounting legs defining a substantially lateral rear leg pivot axis substantially parallel to said lateral translational axis, with each of said rear mounting legs adapted for selective attachment to said vehicle floor, and with each of said rear mounting legs pivotally mounted on said seat frame for selective pivotal retraction about said rear leg pivot axis relative to said seat frame as said seat frame is rotated as aforesaid between said deployed design configuration and said fully tumbled stored-in-floor configuration.

8. A vehicle seat assembly according to claim 7, further comprising rear leg folding means operatively engaging said lateral translation means for positive pivotal retraction of said rear mounting legs about said lateral rear leg pivot axis during said rotation of said seat frame between said deployed design configuration and said fully tumbled stored-in-floor configuration.

9. A vehicle seat assembly according to claim 8, wherein said one or more front mounting legs comprise a first front mounting leg and a second front mounting leg laterally off-set from said first front mounting leg along said second pivot axis.

10. A vehicle seat assembly according to claim 9, wherein said link member comprises a rod member securely and diagonally interconnected as aforesaid by means of a first ball joint and a second ball joint positioned one each at opposite ends of said rod member, with said first ball joint operatively connected to said second front mounting leg, and with said second ball joint operatively connected to said seat frame.

11. A vehicle seat assembly according to claim 10, wherein said second ball joint is operatively connected to an outboard portion of said seat frame.

12. A vehicle seat assembly according to claim 11, wherein said one or more rear mounting legs comprise a first rear mounting leg and a second rear mounting leg laterally off-set from said first rear mounting leg along said rear leg pivot axis.

13. A vehicle seat assembly according to claim 12, wherein said rear leg folding means comprises a movable inner wire surrounded by an outer concentric sheath, said movable inner wire being operatively interconnected between said sleeve and said first rear mounting leg, with said sheath fixedly mounted on an inboard portion of said seat frame.

14. A vehicle seat assembly according to claim 13, wherein said rear leg folding means further comprises a slave tube member rigidly interconnected between said first rear mounting leg and said second rear mounting leg to cause positive pivotal retraction of said second rear mounting leg in unison with positive pivotal retraction of said first rear mounting leg during said rotation of said seat frame between said deployed design configuration and said fully tumbled stored-in-floor configuration.

15. A vehicle seat assembly according to claim 14, wherein said rear leg folding means is adapted for positive pivotal retraction of said rear mounting legs about said lateral rear leg pivot axis during said rotation of said seat frame between said deployed design configuration and said partially tumbled storable configuration.

16. A vehicle seat assembly according to claim 15, wherein said medial seat axis has a substantially vertical seat orientation in said raised partially tumbled storable configuration.

17. A vehicle seat assembly according to claim 16, wherein said rear mounting legs are biased towards a substantially extended leg orientation.

18. A vehicle seat assembly according to claim 17, wherein said rear leg folding means is further adapted to maintain said rear mounting legs in a substantially vertical leg orientation during said rotation of said seat frame between said deployed design configuration and said partially tumbled storable configuration.

* * * * *